April 7, 1964   F. T. GOSTOMSKI   3,127,999
REAR END LOADER
Filed May 15, 1961

INVENTORS.
Frank T. Gostomski
By Ralph M. Faust   Atty.

United States Patent Office
3,127,999
Patented Apr. 7, 1964

3,127,999
REAR END LOADER
Frank T. Gostomski, Renton, Wash.
(3019 54th Ave. E., Tacoma, Wash.)
Filed May 15, 1961, Ser. No. 110,236
2 Claims. (Cl. 214—140)

This invention relates to loaders for farm equipment and particularly to loaders arranged to be mounted at the rear end of tractors having hydraulically actuatable, rearwardly extending, lift arms.

The majority of loaders for tractors are utilized at the front end thereof primarily because a loader so mounted can be raised to greater heights and lift heavier loads than existing rear end loaders and also because the tractor operator, when utilizing a front end loader, can more easily watch working operations. The main disadvantage of front end loaders is that they tend to lift the rear power driven wheels of the tractor from the ground, thereby greatly reducing traction.

Existing rear end loaders are complicated in form, expensive to fabricate and maintain and also generally incapable of lifting heavy loads to heights comparable to heights attainable with front end loaders.

Accordingly, it is an object of the present invention to provide a tractor rear end loader which requires no separate mounting brackets and which may be removed from the tractor as a complete unit.

Another object of the invention is to provide such a loader capable of lifting comparable loads to equivalent heights of existing front end loaders.

Another object of the invention is to provide such a rear end loader wherein the forces existing during a pick-up operation are transmitted directly to the tractor frame rather than through a linkage arrangement.

Still another object of the invention is to provide in such a loader an arrangement accommodating tripping of the bucket and accommodating automatic returning and locking when a load has been released.

Other objects and advantages will become apparent from the following specification and accompanying drawings wherein.

Figure 1:
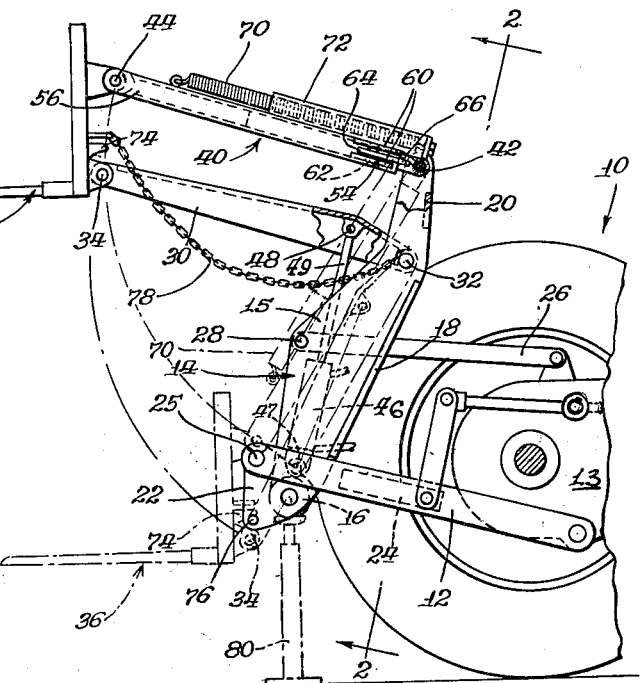
FIGURE 1 is a side elevational view of the preferred embodiment of a rear end loader and including schematically a portion of a typical tractor to which the loader may be attached.

Referring now to the drawings and particularly to FIGURE 1 there is seen a portion of a tractor 10 having spaced rearwardly extending lift arms 12 which are pivotally secured to the rear end of tractor housing 13. The lift arms are connected in a conventional manner to a hydraulic arrangement (not shown) which is a part of and furnished with the tractor. The lift arms 12 form two points of a conventional three point support which is included on tractors of the type herein contemplated for the purpose of attaching thereto various types of farm implements.

Figure 2:
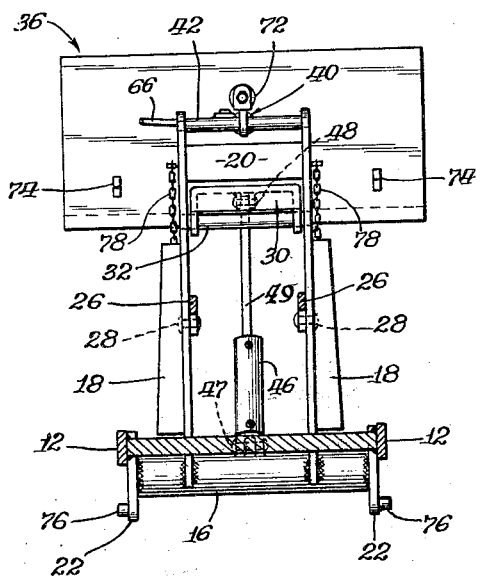
FIGURE 2 is a view of the novel loader taken substantially along line 2—2 in FIGURE 1.

The novel loader arrangement comprises a generally vertically disposed frame indicated generally at 14 which may be formed of spaced steel frame plates 15 which are welded to opposite ends of a tubular support 16 and braced, if desired, by laterally extending gussets 18 as seen in FIGURES 1 and 2. The frame 14 is supported toward the upper end thereof by a cross tie plate 20 which is preferably welded to the plates 15. The lower portion of the frame 14 comprises support arms 22 which may be formed integrally with the plates 15 or welded to the outer ends of tube 16 and accommodate pivotal mounting by means of pivot pins 25 to respective lift arms 12 which, if desired, may be braced by means of a cross bar 24 preferably welded to each of the arms 12. The frame 14 is additionally supported generally centrally thereof by a stabilizer arm or support link 26 which is pivotally mounted to the tractor housing 13. The stabilizer arm 26 is preferably bifurcated for pivotal attachment by means of pins 28 to respective frame plates 15 as best seen in FIGURE 2. The stabilizer arm 26 comprises the third support of the aforementioned conventional three point support arrangement of the tractor.

Pivotally mounted as by means of pivot pin 32 to the frame generally centrally of the tractor between the plates 15 and at a point above pivotal connections 25 and 28 is a rearwardly extending boom 30. The boom 30 is preferably formed with an inverted U-shape cross section to lend greater strength and rigidity thereto and is pivotally connected at its outward end to the lower pivot point 34 of a conventional loader bucket, or other loading device, indicated generally at 36. The frame plates 15 extend upwardly of the pivotal connection 32 and pivotally carry at their upper ends by means of pivot pin 42 the upper trip arm assembly 40 of a parallelogram linkage by means of which the bucket 36 is always maintained substantially at the same angle with respect to ground level.

The upper trip arm assembly 40 comprises a telescoping rod 41 which is fixed to pivot pin 42 and arranged to telescope into a tube 56 the outer end of which is pivotally mounted to the upper pivot point 44 of the bucket 36.

Interconnecting the cross tube 16 and the boom 30 is an auxiliary hydraulic cylinder arrangement wherein a cylinder 46 is pivotally connected at 47 to the tube 16 and the outer end of a cylinder rod 49 is pivotally connected at 48 to the underside of the boom 30. The stroke of the rod 49 in the cylinder 46 is such that, in the lowered position of the bucket, the boom lies approximately parallel to and between the frame plates 15. The ability of the boom to be positioned in this manner gives stability and balance to the loader so that, upon disassembly from the tractor, the loader will remain in upright position with merely the aid of a single jack. Assembly and disassembly is thereby greatly facilitated.

Figure 3:
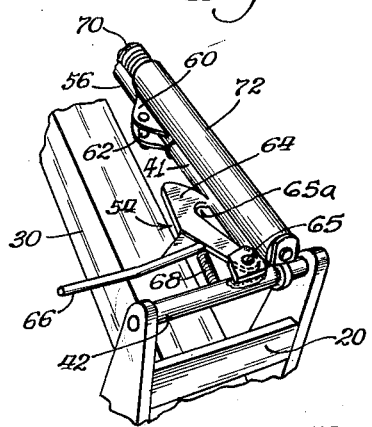
FIGURE 3 is a fragmentary auxiliary view of the bucket tripping arrangement.

Referring again to the upper arm assembly 40 it is seen that the tube 56 is provided with spaced ears 60 interconnected by a locking pin 62 as best seen in FIGURE 3. A cammed hook member 64 is arranged to pivot, as on pin 65, in a plane substantially normal to the plane of pivotal movement of trip arm assembly 40, the pin 65 being received in a bracket which is preferably welded to pivot pin 42. The hook member 64 may also be provided with a handle 66 and also with a spring 68 which is arranged to bias the hook member into a locked position. When the bucket is moved to normal loading position, the tube 56 telescopes over the rod 41 until the pin 62 contacts the hook member 64, urges the latter against the biasing force of spring 68 in a counter-clockwise direction as seen in FIGURE 3, and snaps over the hook portion 65a whereby the bucket is locked in position. The bucket is urged into this locked position by means of a return spring 70 which is connected at one end to a bracket secured to pivot pin 42 and secured at the other end to the tube 56. The spring 70 must be strong enough and be placed under sufficient tension so that it will overcome the weight of the bucket 36 when the latter is empty. When the bucket is loaded, it may be tripped by the operators rotating the trip mechanism 54 by means of handle 66 to release the pin 62 from hook portion 65a whereupon the load carried in the bucket is dumped after which the bucket is returned to normal position by means of spring 70 as described heretofor.

A tube 72 may be positioned over the spring 70 to act as a safety device in the event the spring 70 should break.

Preferably welded to the back of the bucket 36 are a pair of spaced brace means in the form of arms 74 which, when the bucket is in its lowermost position as seen in phantom outline in FIGURE 1, engage corresponding stop pins 76 which are preferably welded to the support arms 22 to transmit working loads directly through the frame to the tractor body rather than through the linkage arms. This feature alleviates bending stresses in the boom and prevents kinking thereof. A pair of chains 78 positioned adjacent the outer surfaces of plates 15 may be utilized, if desired, to prevent the bucket from overtipping when it is tripped or released.

The entire loader arrangement may be removed from the tractor merely by breaking the hydraulic connection (not shown) to cylinder 46 and by releasing pivotal connections 25 and 28. The three point support of the tractor is then available for other use and the loader arrangement may be supported as a complete unit by means of a jack 80, which is shown in phantom in FIGURE 1.

The above described rear end loader arrangement is capable of lifting greater loads to a greater height than existing rear end loaders and, in fact, is comparable to lift and load capacities of front end loaders utilized on the same type of tractors. It will be obvious that various modifications may be made, if desired, in distances between various pivot points to achieve certain desired results. For example, on smaller tractors, the boom pivot points may be moved closer together to obtain higher lift while sacrificing some load capacity with respect to tractor weight. On the other hand, when the arrangement is attached to larger tractors doing heavy industrial work, the main frame and boom may be lengthened to attain greater clearance under the bucket boom pivot point.

I claim:

1. In a rear end loader arrangement for a tractor having spaced rearwardly extending hydraulically actuatable lift arm; spaced frame plates pivoted at their lower ends to respective lift arms; a lower support member interconnecting said plates; a tie plate interconnecting said plates at the upper ends thereof; a support link pivoted to said tractor and to said frame plates at a medial portion thereof; a boom pivot pin interconnecting said plates toward the upper ends thereof; a boom supported at its inner end to said pin substantially centrally of said plates; hydraulic cylinder means pivotably connected to said lower support member and to said boom for pivoting the latter relative to the frame plates; an upper pivot pin interconnecting said plates; a rod connected to said upper pin for pivotal movement therewith; a tube arranged to telescope over said rod; spring means secured to said rod and tube respectively for urging said rod and tube into telescoped position; and releasable means for locking said rod and tube in said telescoped position.

2. In a rear end loader arrangement for a tractor having spaced rearwardly extending hydraulically actuatable lift arms; spaced frame plates pivoted at their lower ends to respective lift arms; a lower support member interconnecting said plates; a tie plate interconnecting said plates at the upper ends thereof; a support link pivoted to said tractor and to said frame plates at a medial portion thereof; a boom pivot pin interconnecting said plates toward the upper ends thereof; a boom supported at its inner end to said pin substantially centrally of said plates; hydraulic cylinder means pivotably connected to said lower support member and to said boom for pivoting the latter relative to the frame plates; an upper pivot pin interconnecting said plates; a rod connected to said upper pin for pivotal movement therewith; a tube arranged to telescope over said rod; spring means secured to said rod and tube respectively for urging said rod and tube into telescoped position; a locking pin carried by said tube in spaced relationship thereto; a hook member receivable over said locking pin for holding the tube in telescoped position over said rod; and means to release said hook member from said locking pin.

References Cited in the file of this patent

UNITED STATES PATENTS

| | | |
|---|---|---|
| 2,357,954 | Johnson | Sept. 12, 1944 |
| 2,402,908 | Neville et al. | June 25, 1946 |
| 2,415,892 | Koehl et al. | Feb. 18, 1947 |
| 2,441,070 | Hoover | May 4, 1948 |
| 2,449,212 | Fraga | Sept. 14, 1948 |
| 2,712,389 | Sewell et al. | July 5, 1955 |
| 2,718,318 | Schucker et al. | Sept. 20, 1955 |